US012784592B2

(12) United States Patent
Kellari

(10) Patent No.: US 12,784,592 B2
(45) **Date of Patent: *Nov. 3, 2026**

(54) VISUAL CUE SYSTEM FOR ROADWAYS

(71) Applicant: Cavnue Technology, LLC, Arlington, VA (US)

(72) Inventor: Demetrios Vasili Kellari, Brooklyn, NY (US)

(73) Assignee: Cavnue Technology, LLC, Arlington, VA (US)

(*) Notice: Subject to any disclaimer, the term of this patent is extended or adjusted under 35 U.S.C. 154(b) by 39 days.

This patent is subject to a terminal disclaimer.

(21) Appl. No.: 18/826,663

(22) Filed: Sep. 6, 2024

(65) Prior Publication Data

US 2025/0069504 A1 Feb. 27, 2025

Related U.S. Application Data

(63) Continuation of application No. 18/158,531, filed on Jan. 24, 2023, now Pat. No. 12,175,870.
(Continued)

(51) Int. Cl.
*G08G 1/0967* (2006.01)
*B60W 60/00* (2020.01)
(Continued)

(52) U.S. Cl.
CPC ..... *G08G 1/096783* (2013.01); *B60W 60/001* (2020.02); *G08G 1/0116* (2013.01);
(Continued)

(58) Field of Classification Search
CPC ........... G08G 1/096783; G08G 1/0116; G08G 1/0141; G08G 1/0145; G08G 1/095;
(Continued)

(56) References Cited

U.S. PATENT DOCUMENTS 10,403,150 B1 9/2019 Nepomuceno et al.
10,991,242 B2 4/2021 Taylor
(Continued)

FOREIGN PATENT DOCUMENTS

CA 3068251 C 3/2023
CN 110765959 A 2/2020
(Continued)

OTHER PUBLICATIONS

U.S. Appl. No. 17/210,099, filed Mar. 23, 2021, Clifford.
(Continued)

*Primary Examiner* — Brian A Zimmerman
*Assistant Examiner* — Anthony D Afrifa-Kyei
(74) *Attorney, Agent, or Firm* — Fish & Richardson P.C.

(57) ABSTRACT

Implementations of a visual cue system for conveying road state data to one or more vehicles traveling on a roadway can include a set of visual cue units that receive road state data and selectively issue a visual cue based on the road state data, at least one visual cue unit including a data processing unit configured to process the road state data and determine a light pattern based on a set of light pattern generation rules, and a light pattern display that selectively issues at least a portion of the light pattern to the one or more vehicles traveling on the roadway.

20 Claims, 5 Drawing Sheets

Related U.S. Application Data

(60) Provisional application No. 63/303,771, filed on Jan. 27, 2022, provisional application No. 63/303,705, filed on Jan. 27, 2022.

(51) Int. Cl.

*G08G 1/01* (2006.01)
*G08G 1/095* (2006.01)
*E01F 15/00* (2006.01)
*H04L 67/12* (2022.01)

(52) U.S. Cl.

CPC ......... *G08G 1/0141* (2013.01); *G08G 1/0145* (2013.01); *G08G 1/095* (2013.01); *G08G 1/096725* (2013.01); *B60W 2552/10* (2020.02); *B60W 2552/50* (2020.02); *B60W 2556/45* (2020.02); *E01F 15/00* (2013.01); *H04L 67/12* (2013.01)

(58) Field of Classification Search

CPC .......... G08G 1/096725; B60W 60/001; B60W 2556/45; B60W 2552/10; B60W 2552/50; E01F 15/00; H04L 67/12

See application file for complete search history.

(56) References Cited

U.S. PATENT DOCUMENTS

| | | | | |
|---|---|---|---|---|
| 11,138,873 | B1 | 10/2021 | Clifford | |
| 12,002,357 | B2 | 6/2024 | Clifford et al. | |
| 12,175,870 | B2 * | 12/2024 | Kellari | B60W 60/001 |
| 2004/0145496 | A1 | 7/2004 | Ellis | |
| 2012/0146763 | A1 | 6/2012 | Teti et al. | |
| 2014/0195068 | A1 | 7/2014 | Boss et al. | |
| 2016/0189542 | A1 | 6/2016 | Myer et al. | |
| 2016/0293003 | A1 | 10/2016 | Ng et al. | |
| 2017/0050638 | A1 | 2/2017 | Gordon et al. | |
| 2017/0213458 | A1 | 7/2017 | Gordon et al. | |
| 2017/0286784 | A1 | 10/2017 | Bhatia et al. | |
| 2019/0132709 | A1 | 5/2019 | Graefe et al. | |
| 2019/0236382 | A1 | 8/2019 | Hall et al. | |
| 2019/0236949 | A1 | 8/2019 | Agarwal | |
| 2019/0352869 | A1 | 11/2019 | Gupta | |
| 2019/0381997 | A1 | 12/2019 | Skokan | |
| 2019/0392712 | A1 | 12/2019 | Ran et al. | |
| 2020/0242922 | A1 | 7/2020 | Dulberg et al. | |
| 2020/0327812 | A1 | 10/2020 | Ran et al. | |
| 2021/0020040 | A1 | 1/2021 | Bradley | |
| 2021/0035443 | A1 | 2/2021 | Young et al. | |
| 2021/0049901 | A1 | 2/2021 | Young et al. | |
| 2021/0157330 | A1 | 5/2021 | Tran | |
| 2021/0318691 | A1 | 10/2021 | Amini et al. | |
| 2021/0404130 | A1 | 12/2021 | Provaznik | |
| 2022/0148419 | A1 | 5/2022 | Lepp | |
| 2022/0208007 | A1 | 6/2022 | Arora | |
| 2022/0222587 | A1 | 7/2022 | Li et al. | |
| 2022/0252424 | A1 | 8/2022 | Zhang | |
| 2022/0284627 | A1 | 9/2022 | Johnson et al. | |
| 2022/0327183 | A1 | 10/2022 | Russo et al. | |
| 2023/0039738 | A1 | 2/2023 | Beaurepaire et al. | |
| 2023/0092432 | A1 | 3/2023 | Clifford et al. | |
| 2023/0182747 | A1 | 6/2023 | Kobayashi et al. | |
| 2023/0186870 | A1 | 6/2023 | Cristache | |
| 2023/0222907 | A1 | 7/2023 | Clifford et al. | |
| 2023/0237900 | A1 | 7/2023 | Kellari | |
| 2023/0237905 | A1 | 7/2023 | Kellari | |
| 2023/0266756 | A1 | 8/2023 | Wengreen et al. | |
| 2023/0271556 | A1 | 8/2023 | Kobashi et al. | |

FOREIGN PATENT DOCUMENTS

| | | | |
|---|---|---|---|
| CN | 111472298 | A | 7/2020 |
| DE | 102013200381 | A1 | 7/2014 |
| GB | 2602391 | A | 6/2022 |
| KR | 102515036 | B | 3/2023 |
| WO | WO 2022080146 | A | 4/2022 |

OTHER PUBLICATIONS

U.S. Appl. No. 17/476,800, filed Sep. 16, 2021, Clifford et al.

U.S. Appl. No. 18/157,867, filed Jan. 23, 2023, Kellari.

Hu et al., "A multirange vehicle speed prediction with application to model predictive control-based integrated power and thermal management of connected hybrid electric vehicles," Journal of Dynamic Systems, Measurement, and Control, Jan. 2022, 144(1):011105, 11 pages.

International Preliminary Report on Patentability in International Appln. No. PCT/US2023/011571, mailed on Jul. 30, 2024, 9 pages.

International Preliminary Report on Patentability in International Appln. No. PCT/US2023/011575, mailed on Aug. 8, 2024, 11 pages.

International Preliminary Report on Patentability in International Appln. No. PCT/US2023/011673, mailed on Aug. 8, 2024, 6 pages.

International Search Report and Written Opinion in International Appln. No. PCT/US2022/050718, mailed on Mar. 6, 2023, 18 pages.

International Search Report and Written Opinion in International Appln. No. PCT/US2023/011571, mailed on May 17, 2023, 15 pages.

International Search Report and Written Opinion in International Appln. No. PCT/US2023/011575, mailed on Apr. 24, 2023, 17 pages.

International Search Report and Written Opinion in International Appln. No. PCT/US2023/011673, mailed on Apr. 19, 2023, 12 pages.

* cited by examiner

VISUAL CUE SYSTEM FOR ROADWAYS

CROSS-REFERENCE TO RELATED APPLICATION

This application is a continuation of U.S. application Ser. No. 18/158,531, filed Jan. 24, 2023, which claims priority to and the benefit of U.S. Provisional Application Nos. 63/303,705 and 63/303,771, filed Jan. 27, 2022. The contents of each of the prior applications are incorporated herein by reference in their entirety.

BACKGROUND

Vehicles can travel on roadways, highways, and backroads to their destination. In many cases, a vehicle can travel along a road with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

SUMMARY

Implementations of the present disclosure are directed to a visual cue system having a set of visual cue units that can be located along a roadway. More particularly, implementations of the present disclosure are directed to a visual cue system having a set of visual cue units that can be configured to provide information to autonomous vehicles, semi-autonomous vehicles, and/or human drivers to improve safety and traffic throughput on roadways.

Implementations of a visual cue system for conveying road state data to one or more vehicles traveling on a roadway can include a set of visual cue units that receive road state data and selectively issue a visual cue based on the road state data, at least one visual cue unit including a data processing unit configured to process the road state data and determine a light pattern based on a set of light pattern generation rules, and a light pattern display that selectively issues at least a portion of the light pattern to the one or more vehicles traveling on the roadway. Other implementations of this aspect include corresponding systems, apparatus, and computer programs, configured to perform the actions of the methods, encoded on computer storage devices.

These and other implementations can each optionally include one or more of the following features: one or more of the visual cue units in the set of visual cue units is absent sensors that are responsive to road state; the light pattern is issued as a human-visible light pattern; the light pattern is issued as a machine-readable light pattern; the light pattern not visible to humans; determining a light pattern includes obtaining vehicle state information of the one or more vehicles, and determining, based on the vehicle state information, a display time and a display location of the light pattern, the light pattern being issued by one or more visual cue units at the display time and the display location; the light pattern display is attached to one or more road barriers located over a distance along the roadway, wherein the light pattern is distributed across the one or more road barriers; a format of the light pattern is determined based on one or more capabilities determined for at least one vehicle of the one or more vehicles; a format of the light pattern is determined based on an operational mode determined for at least one vehicle of the one or more vehicles; the operational mode comprises one or manual, semi-autonomous, and autonomous; the road state information includes one or more of a driving suggestion, a road hazard, a road incident, and waypoint information; and the set of visual cue units are configured to collectively issue the light pattern as a dynamic light pattern.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
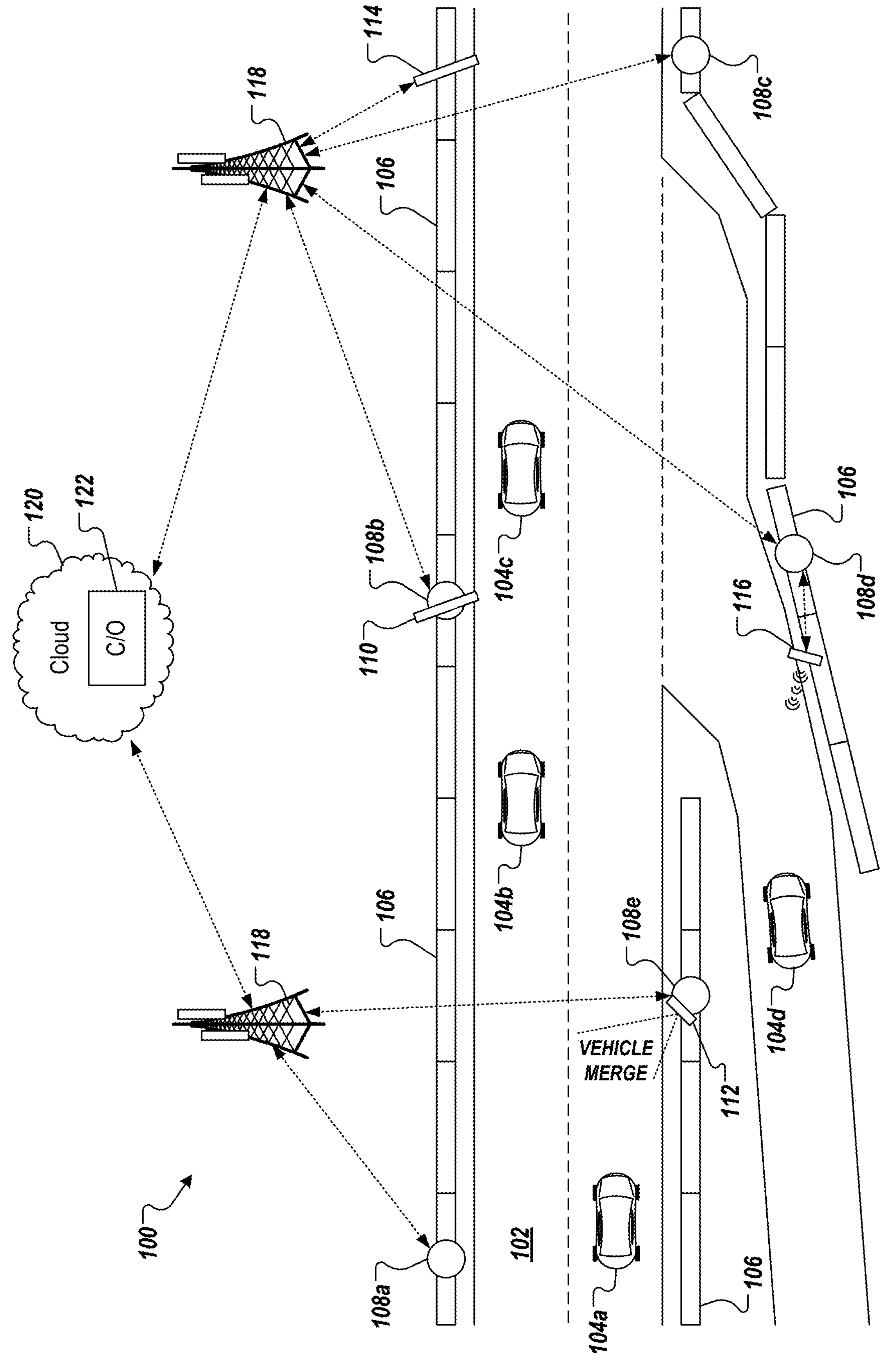
FIG. 1 depicts an example architecture that includes an intelligent road barrier (IRB) system in accordance with implementations of the present disclosure.

Implementations of the present disclosure are directed to a visual cue system having a set of visual cue units that can be located along a roadway. More particularly, implementations of the present disclosure are directed to a visual cue system having a set of visual cue units that can be configured to provide information to autonomous vehicles, semi-autonomous vehicles, and/or human drivers to improve safety and traffic throughput on roadways. In some examples, one or more visual cue units can be removably attached to roadside barriers.

Implementations of a visual cue system for conveying road state data to one or more vehicles traveling on a roadway can include a set of visual cue units that receive road state data and selectively issue a visual cue based on the road state data, at least one visual cue unit including a data processing unit configured to process the road state data and determine a light pattern based on a set of light pattern generation rules, and a light pattern display that selectively issues at least a portion of the light pattern to the one or more vehicles traveling on the roadway.

In some implementations, the visual cue system of the present disclosure can be included as part of an intelligent road barrier (IRB) system, such as that disclosed in commonly assigned U.S. application Ser. No. 18/157,867, filed on Jan. 23, 2023, the disclosure of which is expressly incorporated herein by reference in the entirety for all purposes.

To provide further context for implementations of the present disclosure, and as introduced above, vehicles can travel on surface streets, highways, backroads, and the like (collectively referred to herein as roads or roadways) to their destination. In many cases, a vehicle can travel along a roadway with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

Electronic equipment can be installed along roadways to assist in collection of data and perform other functionality. For example, commonly assigned U.S. application Ser. No. 17/210,099, filed on Mar. 23, 2021, and entitled Road Element Sensors and Identifiers, and commonly assigned U.S. application Ser. No. 17/476,800, filed on Sep. 16, 2021, and entitled Intelligent Entry and Egress for Dedicated Lane, each of which is expressly incorporated herein by reference in the entirety for all purposes, discuss example equipment that can assist in collection of data relevant to roadways and vehicles traveling along roadways.

Roadways can become congested not only with traffic, but with roadside equipment, signage, disparate lane types, accidents, obstructions (e.g., debris), construction, and the like. Consequently, road conditions can be dynamic and should be perceived by or otherwise communicated to vehicles to promote safe and efficient travel. Further, different types of vehicles travel along roadways, such as, for example and without limitation, manual vehicles (e.g., human driver), autonomous vehicles (e.g., driverless vehicles), and semi-autonomous vehicles (e.g., partial operation by human driver), among other types. Road conditions should be perceived or otherwise communicated to any type of vehicle that is traveling along the roadway.

In view of the above context, implementations of the present disclosure are directed to a visual cue system having a set of visual cue units that can be configured to provide information to autonomous vehicles, semi-autonomous vehicles, and/or human drivers, among other types of vehicles, to improve safety and traffic throughput on roadways. In some examples, the visual cue units can be removably attached to existing road barriers positioned along a roadway.

As described in further detail herein, each visual cue unit can include a data processing unit configured to obtain road state information and generate, from the road state information, a light pattern based on one or more light pattern generation rules. In some examples, a visual cue unit can include a plurality of lights that are viewable from the roadway. The plurality of lights can be configured to display the light pattern to one or more target vehicles traveling on the roadway. In some examples, the term visual indicates something that can be perceived by humans and/or sensors. In some examples, something that is visual can be visible to a human and can be visible to a sensor (e.g., visible light). In some examples, something that is visual can be visible to a sensor, but not visible to a human (e.g., non-visible light, such as infrared). Consequently, a visual cue of the present disclosure can be visible to both a human and a sensor, or can be visible to a sensor, but not a human.

In some implementations, a road state can include a set of sub-states that collectively define a comprehensive state of at least a portion of a roadway. Example sub-states can include, without limitation, an agent sub-state, an infrastructure sub-state, and an environment sub-state. In some examples, the agent sub-state represents a state of one or more agents traveling on or otherwise located within proximity of the roadway. Example agents can include, without limitation, drivers, vehicles, pedestrians, animals, and foreign objects (e.g., debris on the roadway, an object falling from a vehicle). The state of a vehicle can include, without limitation, the location, direction, velocity, acceleration, size of the vehicle, and the like. The state of a foreign object or an animal can include the size, location, direction and velocity (e.g., if the foreign object or the animal is moving), and the like. The state of the infrastructure can include, without limitation, a state of repair of the road surface (e.g., defects such as potholes, cracks), coefficient of friction of the road surface (e.g., dampness, iciness, dryness), location of road markings, and temporary structures (e.g., work zones, detours, cones). The state of the environment can include, without limitation, meteorological characteristics such as temperature, pressure, wind speed, rain, snow, ice, fog, sun angle (e.g., sun angle at sunrise or sunset where the sunlight might directly shine into a driver's eyes), haze, illuminance, and the like. In some examples, the meteorological status can include a binary status of a characteristic (e.g., rain or no rain). In some examples, the meteorological status can include an intensity of a characteristic within a range (e.g., [0, 1], where 0 indicates lowest intensity, 1 indicates highest intensity).

As described in further detail herein, implementations of the present disclosure can be provisioned with or within roadway-related systems such as those disclosed in commonly assigned U.S. application Ser. Nos. 17/210,099 and 17/476,800 introduced above. Further, and as noted above, implementations of the present disclosure can be provisioned with or within an IRB system, such as that disclosed in commonly assigned U.S. application Ser. No. 18/157,867. For example, one or more visual cue units can be operable with a set of IRB kits that can be used to configure a roadway to include a dedicated lane and selectively enable movement of vehicles between the dedicated lane and one or more other types of lanes, discussed in further detail herein.

For purposes of illustration, implementations of the present disclosure are described in further detail herein with reference to an IRB system. It is contemplated that implementations of the present disclosure can be realized alone or can be deployed with or within any appropriate system.

FIG. 1 depicts an example architecture that includes an IRB system 100 having a visual cue system provisioned therein in accordance with implementations of the present disclosure. The example architecture includes a roadway 102, along which vehicles 104*a*, 104*b*, 104*c*, 104*d* travel. In the example of FIG. 1, the IRB system 100 includes road barriers 106, IRB kits 108*a*, 108*b*, 108*c*, 108*d*, 108*e*, each of which is mounted to or integrated with a respective road barrier 106. In the example of FIG. 1, the visual cue system includes visual cue units 110, 112, 114, 116. In some examples, one or more telecommunications towers 118 (e.g., representing at least a portion of a cellular network) enable communication with a cloud-based system 120. In the example of FIG. 1, the cloud-based system 120 hosts a control and orchestration (C/O) system 122.

In some examples, the road barriers 106 can be any appropriate type of road barriers, such as, for example and without limitation, continuous (e.g., jersey barriers) or discrete barriers (e.g., delineator posts or bollards). In some examples, the road barriers 106 can be made of concrete, metal, plastic, and/or any other appropriate material. The road barriers can be placed on the roadway 102, which generally functions as a general-purpose roadway, such that a section of the roadway (e.g., a lane of the road) can operate as an intelligent section that provides advanced road operations enabled by the IRB system 100 with communication supported by the visual cue system of the present disclosure. For example, and as represented as a non-limiting example in FIG. 1, the road barriers 106 can be installed in a section of the roadway 102 that includes an on-ramp 102' that vehicles (e.g., the vehicle 104*d*) will accelerate along to eventually merge into traffic on the roadway 102. In some examples, the road barriers 106 can be moved or replaced and reconfigured, for example, in response to changes to the roadway 102.

As depicted in FIG. 1, each IRB kit 108*a*, 108*b*, 108*c*, 108*d*, 108*e* is attached to or integrated with a respective road barrier 106 located along a roadway. As described in further detail herein, each IRB kit 108*a*, 108*b*, 108*c*, 108*d*, 108*e* is operable to collect data representative of one or more characteristics associated with the roadway 102 (e.g., agent characteristics, infrastructure characteristics, environment characteristics), processing of data, communication of data (e.g., to one or more agents, to one or more other IRB kits, to the C/O system 122), and communication of road state information (e.g., to one or more agents, to one or more other IRB kits, to the C/O system 122).

In some implementations, each IRB kit 108*a*, 108*b*, 108*c*, 108*d*, 108*e* can send data generated by one or more sensors to the C/O system 122. The C/O system 122 can process and analyze the data, determine a road state of the roadway 102 based on the data, and send road state information to one or more of the IRB kits 108*a*, 108*b*, 108*c*, 108*d*, 108*e* of the IRB system 100 and/or one or more of the vehicles 104*a*, 104*b*, 104*c*, 104*d*. For example, in system-level optimization use cases, the IRB system 100 can aggregate sensor data from multiple sensors and send the aggregated sensor data to the C/O system 122. The C/O system 122 can synchronize and coordinate between the sensor data collected by different sensors at the system level. For example, the C/O system 122 can be configured to process the sensor data obtained by the sensors of different IRB kit 108*a*, 108*b*, 108*c*, 108*d*, 108*e* and to coordinate temporal-spatial information of the sensor data.

Generally, the vehicles 104*a*, 104*b*, 104*c*, 104*d* can move along or traverse the roadway 102 and can decide whether to use a general-purpose lane or a dedicated lane, if any. For example, one or more of the vehicles 104*a*, 104*b*, 104*c*, 104*d* moving along a general-purpose lane can be informed of a dedicated lane entry point at a set distance prior to the beginning of a transition lane (e.g., transition from the general-purpose lane to the dedicated lane). In some examples, the roadway 102 can include an opening lane to allow vehicles to merge into a transition lane. Each vehicle 104*a*, 104*b*, 104*c*, 104*d* can determine (e.g., using an on-board artificial intelligence) to access the dedicated lane by moving into an opening lane and subsequently into the transition lane. In another example, a driver of one of the vehicles 104*a*, 104*b*, 104*c*, 104*d* can decide to access the dedicated lane by viewing a display located at the set distance prior to the beginning of the transition lane and make the decision to move into the opening lane and subsequently into the transition lane.

A general-purpose lane can correspond to a lane that is driven on by the public without any restrictions or tolls. For example, the general-purpose lane can include a lane that a driver can drive freely towards their destination. An opening lane can correspond to a lane that enables vehicles to move between a general-purpose lane and a transition lane. A transition lane can correspond to a lane that enables a vehicle to approach a dedicated lane. A dedicated lane can correspond to a lane that enables the vehicle with special access following meeting conditions or criteria determined by the IRB system 100.

In some implementations, the C/O system 122 can generate a roadway configuration that includes one or more dedicated lanes and that enables access and egress to the one or more dedicated lanes in the IRB system 100. The roadway configuration can enable both autonomous, semi-autonomous, and human controlled vehicles to access the dedicated lanes. In some examples, the specific roadway configuration of lanes can enable one or more vehicles to enter the dedicated lanes with minimal disruption to surrounding vehicles, neighboring vehicles, or vehicles already driving within the dedicated lanes. For example, the C/O system 122 can assess road state to selectively modify lane designations of the roadway 102 to generate a roadway configuration that enables access and egress to the dedicated lanes. In some examples, the C/O system 122 can generate a new roadway configuration for enabling access and egress to dedicated lanes. In some examples, the C/O system 122 can change designation of a lane from general-purpose to dedicated or from dedicated to general-purpose in response to road state information.

In further detail, the C/O system 122 can generate roadway configurations that include various lane designations and characteristics. The various lane designations can include general-purpose lanes, opening lanes, transition lanes, and dedicated lanes. In some examples, the number of each designated lane for the roadway configuration may vary depending on the number of lanes available on the roadway 102. For example, the number of lanes along a section of the roadway 102 can range from 1 to n, where n is an integer that is greater than 1. In some examples, a minimum number of general-purpose lanes can be required. For example, if a section of the roadway 102 includes two lanes and the minimum number of general-purpose lanes is two, no lane can be designated as a dedicated lane for the section. As another example, if a section of the roadway 102 includes three lanes and the minimum number of general-purpose lanes is two, one lane can be designated as a dedicated lane for the section.

In some examples, the C/O system 122 can determine a number of characteristics associated with each lane of the roadway 102. Example characteristics can include, without limitation, a length of a lane, a width of a lane, a number of turns for each lane, and an angle of the turns for each lane. The C/O system 122 can configure these lanes using the various characteristics. The C/O system 122 can generate the roadway configuration with the various characteristics based on obtained sensor data, historical data, vehicular data, and other roadway configuration data.

In some examples, for the C/O system 122 to generate roadway configurations, the C/O system 122 can analyze road state information, which, among other features, can represent the positions, movements, and other characteristics of vehicles and/or other agents along one or more prior configured roadways. For example, the C/O system 122 can analyze characteristics of vehicles driving on the prior roadways to determine a specific geometric roadway configuration that enables vehicles to access and egress dedicated lanes. In some examples, the IRB system 100 can generate and monitor sensor data over time to describe characteristics of the agents (road actors) along certain points of the prior configured roadways. For example, the C/O system 122 can acquire from prior roadways configured with sensors: (i) observations of prevailing speeds of vehicles in general purpose lanes; (ii) observations of historic speeds of vehicles along a roadway; (iii) observations of vehicle dynamics; and, (iv) observations of sensor fields of view to ensure vehicles are properly seen at each portion along the configured roadway. The C/O system 122 can obtain sensor data from sensors monitoring the one or more prior configured roadways. Based on the sensor data, the C/O system 122 can generate a specific geometric configuration of a new roadway that enables vehicles in traffic to divert from the general-purpose lane to access and egress one or more dedicated lanes.

In some examples, after the C/O system 122 has generated and deployed the roadway configuration (e.g., by way of construction of the newly generated roadway configuration or another form of deployment), the IRB system 100 can monitor aspects and characteristics of vehicles in the configured roadway to allow for entry and exiting into the one or more dedicated lanes based on the IRB kits 108*a*, 108*b*, 108*c*, 108*d*, 108*e* positioned along the configured roadway. The IRB kits 108*a*, 108*b*, 108*c*, 108*d*, 108*e* can be deployed in a longitudinal manner along the roadway 102 to monitor the vehicles, their position, and their movement amongst other vehicles.

As described in further detail herein, the IRB kits 108*a*, 108*b*, 108*c*, 108*d*, 108*e* can generate observations regarding agents moving in the configured general-purpose lane, the opening lane, the transition lane, and the dedicated lane. In some examples, the IRB kits 108*a*, 108*b*, 108*c*, 108*d*, 108*e* can determine other characteristics about vehicular traffic in their corresponding fields of view (e.g., vehicle density per unit area, vehicle congestion, vehicle headway, vehicle dynamics). For example, the IRB kits 108*a*, 108*b*, 108*c*, 108*d*, 108*e* can each identify an object as the object enters its field of view. Based on the identification of the object, the IRB kits 108*a*, 108*b*, 108*c*, 108*d*, 108*e* can further describe a location of the vehicles along the configured roadway, a speed of the vehicle, a relationship between vehicles (e.g., vehicle headway describing distance and time between two moving vehicles), and others, to name a few examples.

In accordance with implementations of the present disclosure, the visual cue units 110, 112, 114, 116 of the visual cue system can be used to communicate road state data to drivers and/or vehicles. In the example of FIG. 1, the visual cue units 110, 112 are included as part of the IRB kits 108*b*, 108*e*, respectively. For example, the visual cue units 110, 112 can be part of respective state conveyance systems of the IRB kits 110, 112. In the example of FIG. 1, the visual cue units 114, 116 are stand-alone (i.e., not included as part of a IRB kit), where the visual cue unit 114 can be communicated with over the cellular network and the visual cue unit 116 is communicated with through the IRB kit 108*d*.

In some examples, visual cue units can have different capabilities. For example, a first visual cue unit can have a first type of light pattern display and a second visual cue unit can have a second type of light pattern display. In some examples, the first type of light pattern display can use a visible light range of the electromagnetic spectrum to display light patterns that are visible to humans and cameras. In some examples, the second type of light pattern display can use a non-visible light range of the electromagnetic spectrum to display light patterns that are not visible to humans, but can be detected by certain types of cameras and/or sensors. In some examples, a third visual cue unit can have the first type of light pattern display and the second type of light pattern display.

For example, and with non-limiting reference to the example visual cue units 110, 112, 114, 116 of FIG. 1, the visual cue units 110, 114 can each include a light pattern display that emits visible light that is perceptible to humans and cameras, and the visual cue unit 112 can include a light pattern display provided as a projector that projects visible light onto the roadway (e.g., a text message "vehicle merge") that is perceptible to humans and cameras. Continuing with the example of FIG. 1, the visual cue unit 116 can include a light pattern display that emits non-visible light (e.g., infra-red) that is not visible to humans, but can be detected by certain types of cameras and/or sensors (e.g., infra-red cameras/sensors).

Figure 2:
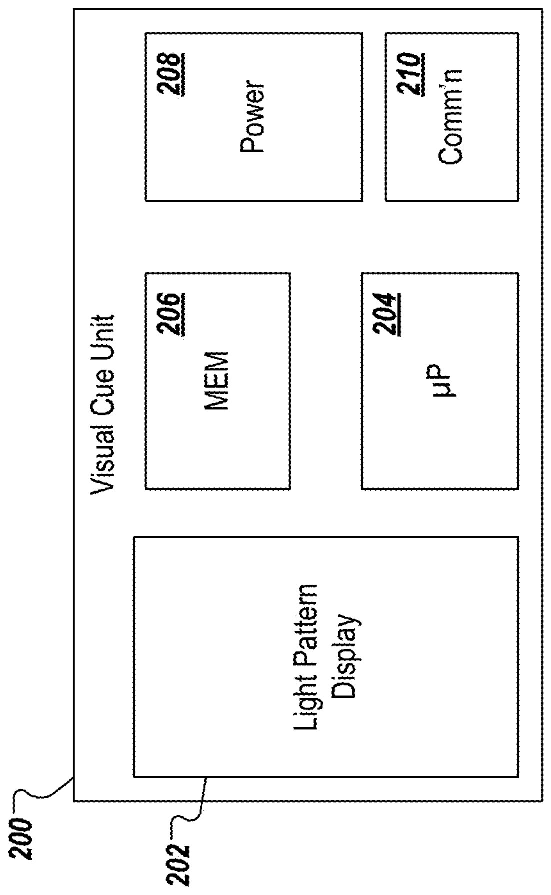
FIG. 2 depicts an example visual cue unit in accordance with implementations of the present disclosure.

FIG. 2 depicts an example visual cue unit 200 in accordance with implementations of the present disclosure. The example visual cue unit 200 can be representative of one or more of the visual cue units 110, 112, 114, 116 of FIG. 1. In the example of FIG. 2, the example visual cue unit 200 includes a light pattern display 202, one or more processors 204, memory (e.g., non-volatile memory), a power unit 208, and a communication unit 210.

In some examples, the one or more processing units 204 are configured to determine light patterns that are to be displayed and to provide instructions to the light pattern display 202. In some examples, the light pattern instructions can include a light pattern that is to be displayed, a type of light pattern display that is to be used, and a start time and end time for display of the light pattern.

In some examples, the power unit 208 is configured to supply power for the visual cue unit 200. In some implementations, the visual cue unit 200 is a self-contained system without a need for external power (e.g., wired connection to a power source). The road barriers with visual cue units 200 installed are movable and can be easily relocated as needed. For example, the power unit can include a solar panel and a battery for all day and backup power. In some implementations, the visual cue unit 200 can be connected to an external power supply. For example, the power unit can 208 include a power cable microtrenched below or within the respective road barrier.

In some examples, the communication unit 210 is configured to transmit and/or receive data. For example, the communication unit 210 can send data to and/or receive data from the C/O system 122. As another example, the communication unit 210 can send data to and/or receive data from one or more IRB kits within an IRB system. As another example, the communication unit 210 can send data to and/or receive data from one or more other visual cue units within a visual cue system.

In some implementations, the communication unit 210 can be configured to receive information from an agent traveling on the roadway near the barrier. An agent (e.g., an autonomous vehicle) can include sensors configured to capture information of the environment. The agent can generate road state data based on the sensor data captured by the sensors of the agent. The agent can send sensor data and/or road state data to one or more visual cue units 200 in a visual cue system, which can forward the data (e.g., to a C/O system, to one or more IRB kits of an IRB system.

In some implementations, the light pattern display 202 enables road state information to be communicated to one or more agents (e.g., vehicles) as road state data. In some examples, the light pattern display 202 includes a lighting configuration to display data indicative of road state to one or more vehicles. In some examples, the light pattern display 202 can display the road state information to an agent that is able to observe the display device, such that the agent can make autonomous or semi-autonomous decisions based on the road state information. The light pattern display 202 can include any appropriate type of display device. For example, the light pattern display 202 can be a light-emitting display device (e.g., a backlit display) or a non-light-emitting display device (e.g., an electronic ink device). The data indicative of the road state can be in any appropriate format, such as encoded light signal, a QR code, a textual message, an image, or a video. In some implementations, the light pattern display 202 can be configured to display data that is not readable by a human driver (e.g., data encoded in a visible code that is not human-readable).

For example, the light pattern display 202 can be installed on one side of a jersey barrier. The light pattern display 202 can display an icon (e.g., a machine-readable code) indicating a road state of the roadway. A camera of an autonomous vehicle traveling on the roadway can capture an image of the icon displayed on the light pattern display 202. An on-board system of the vehicle can analyze the camera image and determine the road state information encoded in the icon. The autonomous vehicle can make autonomous driving decisions based on the road state information determined from the camera image of the icon.

As another example, the light pattern display 202 can display a textual message indicating a road state of the roadway. A human driver of a traditional vehicle traveling on the roadway can recognize the text message. The human driver can make driving decisions based on the textual message. For example, the human driver can determine to slow down, if the textual message indicates that the roadway in 50 meters has an icy road surface.

In further detail, and as introduced above, the light pattern display of a visual cue unit can display light patterns to communicate information to drivers and/or vehicles, such as road state data. In some examples, light patterns can be provided based on display time (e.g., start time and end time for each light of a plurality of lights), display location, display color, and any other appropriate configuration of light patterns. For example, a light pattern can be a dynamic light pattern that changes over a period of time and/or across different locations (e.g., displayed using a first visual cue unit for a first period of time, and displayed using a second visual cue unit for a second period of time). Each light pattern can be displayed using a set of lights, which can include, for example and without limitation, light-emitting diodes (LEDs). It is contemplated that any appropriate light can be used. In some examples, the set of lights can be embedded into or fixed to road barriers (e.g., fixed on the top of the road barriers).

In some examples, the set of lights can be attached to two or more barriers located over a distance on the roadway, and the light pattern can be distributed across the set of lights over the distance on the roadway. For example, the visual cue system can include an array of lights installed on an array of road barriers and one light can be installed on each road barrier.

In some implementations, the data processing unit of the visual cue system can receive road state information depicting a state of the road. The road state information can include one or more of a lane type indication (e.g., general-purpose, dedicated), a driving suggestion (e.g., headway guidance, speed guidance), a road hazard, a road incident, waypoint information, and the like. The road state information can be generated from sensor data obtained by one or more sensors (e.g., of an IRB kit).

In some implementations, light patterns are determined using one or more light pattern generation rules. In some examples, the light pattern generation rules can map a road state to a light pattern. Table 1 represents non-limiting examples of light pattern generation rules that map road states to light patterns:

TABLE 1

Example Road State and Light Pattern Mapping

| Road State | Light Pattern |
|---|---|
| Vehicle Speed | Pattern 1-vehicle too slow<br>Pattern 2-vehicle too fast |
| Merging Traffic | Pattern 3-vehicle merge |
| Dangerous Road Conditions | Pattern 4-warning |
| Traffic Congestion | Pattern 5-warning |
| Debris | Pattern 6-warning |

For example, if road state data indicates that a vehicle is driving at a normal speed (e.g., within a threshold speed of a speed limit) no light pattern is displayed. If the road state data indicates that a vehicle is driving too slowly (e.g., under a threshold speed of the speed limit) or too quickly (e.g., under a threshold speed of the speed limit), a respective light pattern can be displayed (e.g., text message indicating speed-up or slow-down, red light). As another example, if the road state data indicates that traffic congestion is ahead, a respective light pattern can be displayed (e.g., a text message indicating "traffic ahead" and/or "slow down").

In some implementations, the road state information includes vehicle state information of a target vehicle, to which the visual cue system is to display a light pattern. For example, vehicle state information can include speed and location of the target vehicle. The light pattern, if any, can be determined based on speed, and whether or when to display the light pattern can be determined based on speed and/or location of the target vehicle. For example, a visual cue unit can determine to display a light pattern when the visual cue unit is in a field-of-view (FOV) of the vehicle. In this manner, perception of the light pattern by the vehicle (or driver of the vehicle) is enabled.

To further illustrate this, a non-limiting example is provided. For example, the road state information can indicate that a target vehicle is traveling at 70 miles per hour (mph), which can be considered too fast for a respective roadway (e.g., speed limit is 55 mph). It can be determined that it will take 200 milliseconds (ms) for the road state information to reach the plurality of lights attached to the barriers. A location of the target vehicle can be determined based on the distance that the target vehicle would travel in the 200 milliseconds period of time. Based on the predicted location of the target vehicle, it can be determined when and where the light pattern is to be displayed.

In some implementations, a type of the light pattern can be determined based on capabilities of a target vehicle and/or an operational state of the target vehicle. In some examples, the capabilities and/or operational state can be included as road state data. In some examples, the capabilities and/or operational state can be determined based on data transmitted by the target vehicle and/or otherwise determined for the target vehicle. Example data can include, without limitation, a non-unique identifier associated with the target vehicle (e.g., a type, make, model of the target vehicle), a universally unique identifier (UUID) assigned to the target vehicle, an operational state of the target vehicle (e.g., manual, autonomous, semi-autonomous).

In some examples, the target vehicle can transmit data as an encoded signal that is received by one or more processing units (e.g., a C/O system, IBR kits of an IBR system) and can be decoded. In this manner, the one or more processing units can determine the capabilities and/or operational state of the target vehicle to be included in the road state data. For example, the data can include a non-unique identifier that can be used to look-up (e.g., from a vehicle database) the type, make, and model of the target vehicle and an inventory of capabilities of the target vehicle based thereon (e.g., types of sensors, locations of sensors on the target vehicle). As another example, the data can include a UUID that can be used to look-up (e.g., from a vehicle database, from a vehicle registration database) details of the target vehicle that can include an inventory of capabilities of the target vehicle based thereon (e.g., types of sensors, locations of sensors on the target vehicle).

In some examples, the data can be determined based on one or more images of the target vehicle. For example, one or more images of the target vehicle can be captured and one or more processing units (e.g., a C/O system, IBR kits of an IBR system). Image recognition can be performed to determine the type, make, and model of the target vehicle, which can be used to determine an inventory of capabilities of the target vehicle based thereon (e.g., types of sensors, locations of sensors on the target vehicle). In some examples, image recognition can be performed to determine a UUID associated with the target vehicle (e.g., read from a license plate of the target vehicle), which can be used to determine an inventory of capabilities of the target vehicle based thereon (e.g., types of sensors, locations of sensors on the target vehicle).

As introduced above, a type of the light pattern can be determined based on capabilities of the target vehicle and/or the operational state of the target vehicle. For example, if it is determined that the target vehicle is a manual vehicle (e.g., a vehicle without autonomous or semi-autonomous capabilities) and is absent particular types of sensors (e.g., cameras, light sensors), the type of light pattern can include a visible light pattern intended to be perceived by a driver (and/or passenger) of the target vehicle. As another example, if it is determined that the target vehicle is a manual vehicle (e.g., a vehicle without autonomous or semi-autonomous capabilities) and includes particular types of sensors (e.g., cameras, light sensors), the type of light pattern can include a visible light pattern intended to be perceived by a driver (and/or passenger) and/or a non-visible light pattern intended to be perceived by one or more of the sensors. As another example, if it is determined that the target vehicle is an autonomous-capable vehicle (e.g., a vehicle with autonomous or semi-autonomous capabilities), but the operational state is manual, the type of light pattern can include a visible light pattern intended to be perceived by a driver (and/or passenger) and/or a non-visible light pattern intended to be perceived by one or more sensors equipped on the target vehicle. As still another example, if it is determined that the target vehicle is an autonomous-capable vehicle (e.g., a vehicle with autonomous or semi-autonomous capabilities), and that the operational state is autonomous, the type of light pattern can include a non-visible light pattern intended to be perceived by one or more sensors equipped on the target vehicle.

In some implementations, and for a target vehicle having sensors that can perceive visible light patterns and/or non-visible light patterns, the target vehicle can include software that can decode data encoded in the light patterns. For example, visual cue grammar data sets can be provided to vehicle original equipment manufacturers (OEMs) to program a perception system of the target vehicle, such that the perception system of the target vehicle can be programmed to determine road state information from the light patterns. In some examples, the light pattern can represent a machine-readable code (e.g., bar code, quick response (QR) code) that can be decoded to determine road state data. In some examples, the light pattern can be a signal (e.g., within the non-visible range of the electromagnetic spectrum) that can be decoded to determine road state data.

When traveling on a roadway, the target vehicle can perceive (e.g., view, receive) a light pattern generated from the visual cue system and can determine the road state information from the light pattern. In some examples, the target vehicle can determine a driving decision based on the road state information (e.g., if operating in an autonomous mode or semi-autonomous mode). In some examples, the target vehicle can include an internal display to display the road state information to occupants of the target vehicle. In this manner, a driver of the vehicle can be informed of the road state information and can determine a driving decision. In such an example, redundancy can be provided. For example, a visible light pattern can be displayed by a visual cue unit for perception by a driver, and the target vehicle can provide an internal display with the road state information for perception by the driver.

In some implementations, the visual cue system can display light patterns to a specific vehicle, such as a target vehicle discussed above. In some examples, the light pattern can be displayed to the target vehicle when the target vehicle is in a FOV of a visual cue unit to the exclusion of other vehicles (e.g., only a single vehicle can occupy the FOV). In some examples, the light pattern can encode a UUID of the target vehicle, such that multiple vehicles perceiving the light pattern can decode the light pattern, determine the UUID, and only the vehicle matching the UUID acts on the road state data that is also encoded in the light pattern.

In some implementations, the target vehicle can be driven by a human driver who can determine the road state information from the light pattern that is in a human readable format (e.g., textual message). Based on the road state information obtained from the light pattern, the human driver can make a driving decision. For example, the visual cue system can show a green light attached to a road barrier when a vehicle traveling in front of the target vehicle is traveling at normal speed. A human driver can see the green light and can determine to travel at normal speed as well. As another example, the visual cue system can show a yellow light when the vehicle traveling in front of the target vehicle is traveling slower than a posted speed limit. A human driver can see the yellow light and can determine to take extra caution in approaching the vehicle that is travel slowly.

In some implementations, the visual cue system can orchestrate and control visual display within the road barriers. The visual cue system can display on one or more lights installed on a first barrier a light pattern indicating road state information generated from sensor data obtained on a second barrier. For example, a sensor on a first road barrier 500 meters away from the target vehicle can obtain sensor data indicating an icy road surface ahead of a target vehicle. It may not be practical to show this road state information on the first road barrier because the first road barrier is too far away from the target vehicle. The visual cue system can send the icy road state information from the first barrier to a visual cue unit on a second barrier that is closer to the target vehicle. Although the sensor on the second barrier has not detected the icy road state, the visual cue system can pass this road state information to the second barrier. The data processing unit on the second barrier can generate a light pattern based on the icy road state information. One or more lights installed on the second road barrier can display the light pattern to the target vehicle. Therefore, the autonomous driving system or a human driver of the target vehicle can slow down before arriving at the segment of the road that is icy.

In some implementations, the plurality of lights can be configured to create dynamic signs. A traditional roadway has multiple static signs that display road information (e.g., name of the road, speed limit, highway information, etc.). The plurality of lights can be configured to create dynamic signs that can be displayed at different times of the day based on road state information. For example, when the road state information indicates a vehicle is driving over the speed limit, the plurality of lights can display speed limit information. Thus, the dynamic signs created by the plurality of lights can replace some of the static signs (e.g., signs that are needed occasionally and dynamically), saving display space on the roadway and reducing the cost of putting up and maintaining a large number of static signs.

Figure 3A:
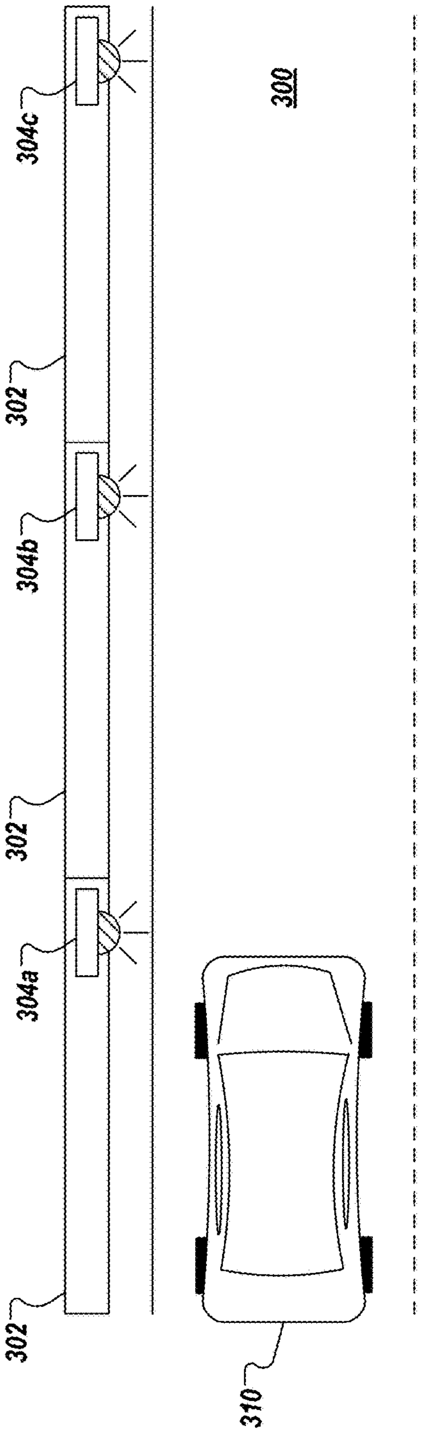
FIGS. 3A-3C depict an example use case using an example visual cue system in accordance with implementations of the present disclosure.
Figure 3B:
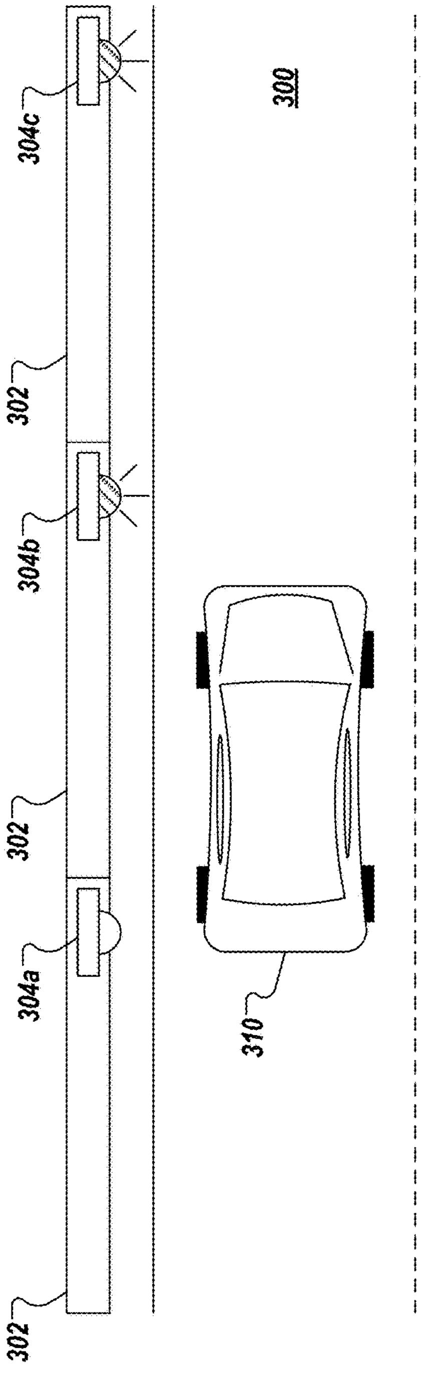
Figure 3C:
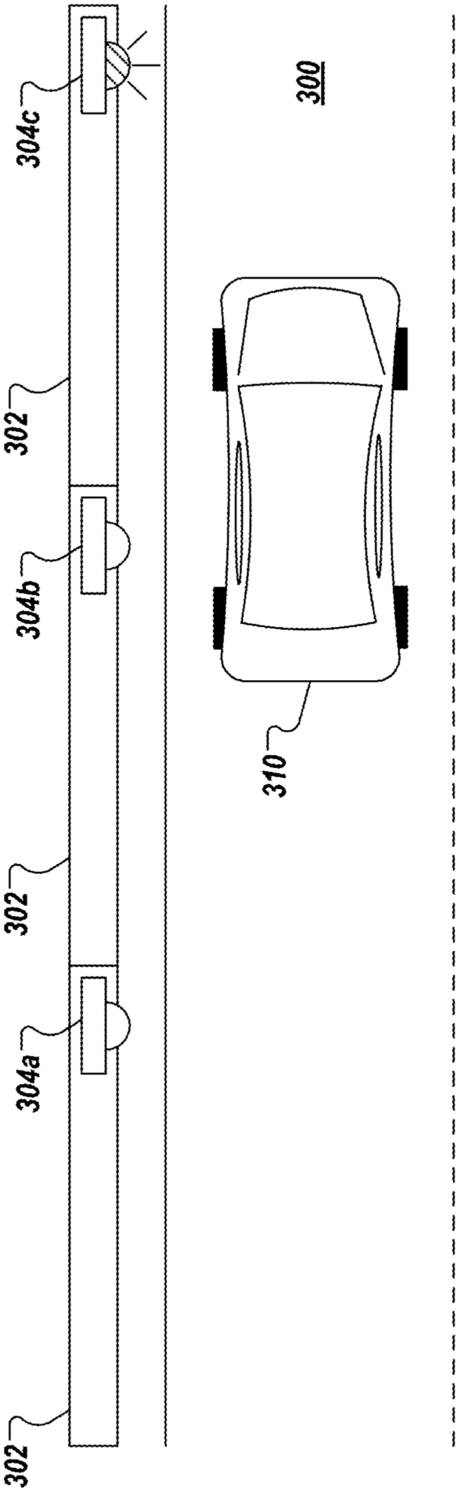

FIGS. 3A-3C depict an example use case using an example visual cue system in accordance with implementations of the present disclosure. FIGS. 3A-3C depict a portion of a roadway 300 that includes road barriers 302 positioned there along. Light pattern displays 304*a*, 304*b*, 304*c* are provided. In some examples, the light pattern displays 304*a*, 304*b*, 304*c* correspond to separate, standalone visual cue units of the visual cue system. In some examples, the light pattern displays 304*a*, 304*b*, 304*c* are part of a single visual cue unit of the visual cue system.

In the example of FIGS. 3A-3C, a vehicle 310 is traveling along the roadway 300. It can be determined that a vehicle (not depicted) ahead of the vehicle 310 is driving too slowly and that a light pattern is to be provided for the vehicle 310 to caution the vehicle 310 of the slower vehicle ahead. With particular reference to FIG. 3A, each of the light pattern displays 304*a*, 304*b*, 304*c* issues the light pattern (e.g., a yellow light). As the vehicle 310 progresses along the roadway 300, which light pattern displays 304*a*, 304*b*, 304*c* can change. For example, in FIG. 3B, the vehicle 310 has progressed sufficiently past the light pattern display 304*a* that the light pattern display 304*a* no longer displays the light pattern. As another example, in FIG. 3C, the vehicle 310 has progressed sufficiently past the light pattern display 304*b* that the light pattern display 304*b* no longer displays the light pattern.

Figure 4:
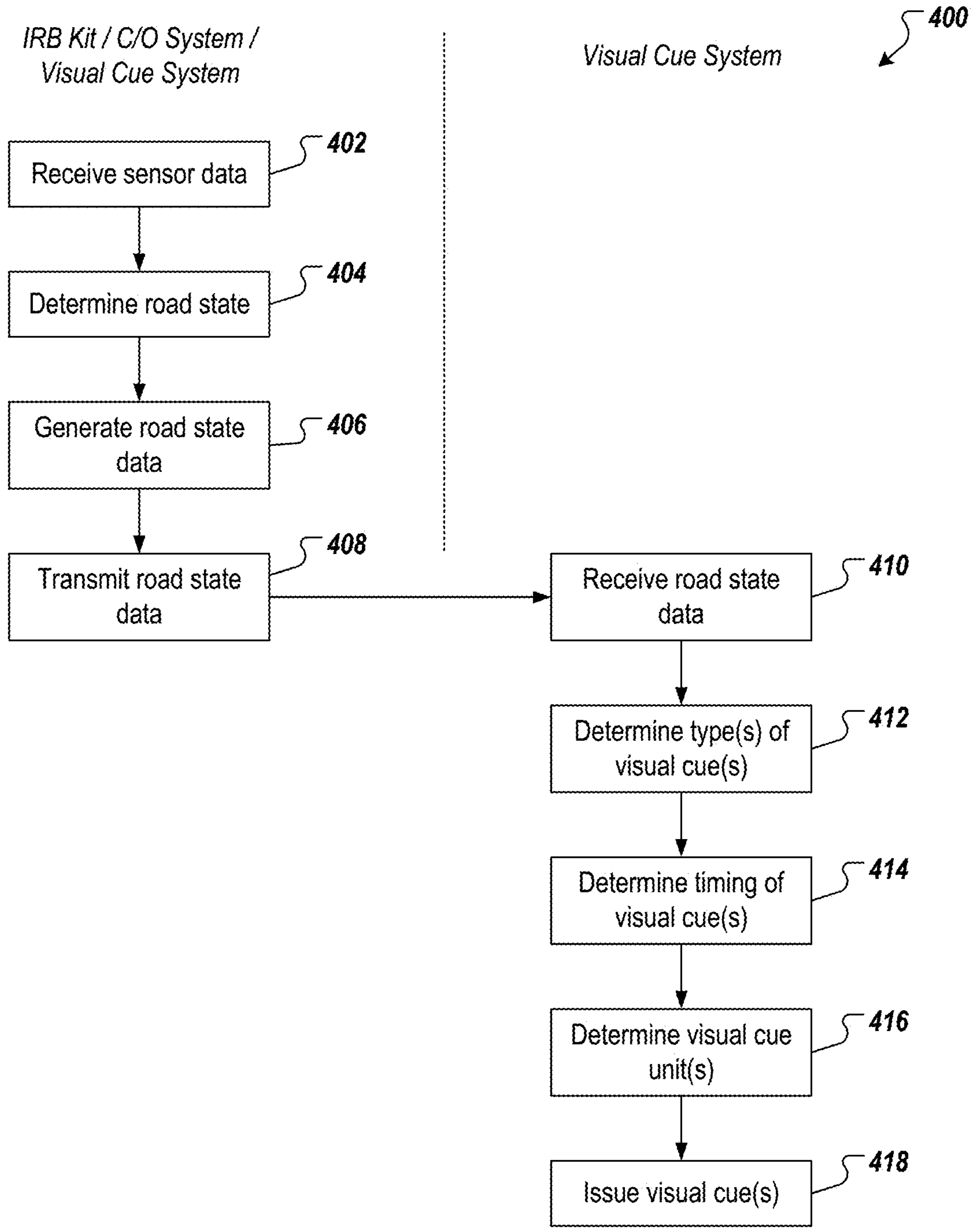
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

Sensor data is received (402). For example, and as described herein, at least one of the IRB kits and/or the C/O system receives sensor data. A road state is determined (404). For example, and as described herein, the at least one of the other IRB kits and/or the C/O system processes the sensor data to determine the road state of the roadway. Road state data is generated (406). For example, and as described herein, the at least one IRB kit and/or the C/O system generates the road state data, which is representative of the road state. For example, and without limitation, the road state data can indicate a configuration of the roadway, which can include one or more general-purpose lanes and one or more dedicated lanes. The road state data is transmitted (408). For example, and as described herein, the at least one IRB kit and/or the C/O system transmits the road state data to the visual cue system.

The road state data is received (410). For example, and as described herein, the visual cue system (e.g., the C/O system as part of the visual cue system, an IRB kit as part of the visual cue system, a visual cue unit of the visual cue system) receives the road state data. Types of one or more visual cues is determined (412). For example, and as described herein, a format of each of the one or more visual cues (e.g., human-visible light, human-readable text, machine-readable code, infrared light) is determined. In some examples, the format is determined based on capabilities of one or more vehicles that the visual cue is targeted to. For example, if a group of vehicles, the format can be a human-perceivable and human-readable format. As another example, one or more vehicles having particular types of sensors, the format can be a human-perceivable, but not human-readable format (e.g., machine-readable code) or a not human-perceivable format (e.g., infrared light).

Timing of the one or more visual cues is determined (414). For example, and as described herein, a visual cue can be timed to ensure that it is perceivable by a vehicle (e.g., timed for when the vehicle is within a FOV of visual cue units). One or more visual cue unit(s) to issue the one or more visual cues are determined (416). For example, and as described herein, visual cue units that are capable of issuing visual cues in the appropriate format and having a FOV, through which a vehicle will pass can be selected as a sub-set of visual cue units that are to issue the visual cues. The one or more visual cues are issued (418). For example, and as described herein, the visual cue units issue the visual cues.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium) for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are described in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

What is claimed is:

1. A visual cue unit for conveying road state data to one or more vehicles traveling on a roadway, the visual cue unit comprising:

a data processing unit configured to execute instructions to cause the data processing unit to perform operations comprising:

receiving road state data, determining, from a plurality of candidate types of light patterns, a type for a light pattern based on a capability of a vehicle that the light pattern is to be targeted to, and determining the light pattern based on the road state data and the type for the light pattern; and a light pattern display that selectively issues at least a portion of the light pattern, wherein a set of visual cue units are configured to collectively issue the light pattern as a dynamic light pattern.

2. The visual cue unit of claim 1, wherein the visual cue unit is absent sensors that are responsive to road state.

3. The visual cue unit of claim 1, wherein the light pattern is a human-visible light pattern.

4. The visual cue unit of claim 1, wherein the light pattern is a machine-readable light pattern.

5. The visual cue unit of claim 1, wherein the light pattern is not visible to humans.

6. The visual cue unit of claim 1, wherein determining the light pattern comprises:

obtaining vehicle state information of the vehicle; and determining, based on the vehicle state information, a display time and a display location of the light pattern, the light pattern being issued by one or more visual cue units at the display time and the display location.

7. The visual cue unit of claim 1, wherein the light pattern display is attached to one or more road barriers located over a distance along the roadway, wherein the light pattern is distributed across the one or more road barriers.

8. The visual cue unit of claim 1, wherein determining the type for the light pattern comprises determining the type for a format of the light pattern based on an operational mode determined for the vehicle.

9. The visual cue unit of claim 8, wherein the operational mode comprises one of manual, semi-autonomous, and autonomous.

10. The visual cue unit of claim 1, wherein the road state data comprises one or more of a driving suggestion, a road hazard, a road incident, and waypoint information.

11. The visual cue unit of claim 1, wherein the capability of the vehicle comprises the vehicle having a particular type of sensor, and determining the type for the light pattern comprises:

determining, from the plurality of candidate types of light patterns, the type for the light pattern that can be processed by the particular type of sensor on the vehicle.

12. A computer-implemented method for selectively issuing light patterns from one or more visual cue units, the method comprising:

receiving road state data;

determining, from a plurality of candidate types of light patterns, a type for a light pattern based on a capability of a vehicle that the light pattern is to be targeted to, wherein determining the type for the light pattern comprises determining the type for a format of the light pattern based on an operational mode determined for the vehicle;

determining the light pattern based on the road state data and the type for the light pattern; and issuing the light pattern on a light pattern display of a visual cue unit.

13. The method of claim 12, wherein the light pattern is a human-visible light pattern.

14. The method of claim 12, wherein the light pattern is not visible to humans.

15. The method of claim 12, wherein the light pattern is issued as a machine-readable light pattern.

16. The method of claim 12, wherein determining the light pattern comprises:

obtaining vehicle state information of the vehicle; and determining, based on the vehicle state information, a display time and a display location of the light pattern, the light pattern being issued at the display time and the display location.

17. The method of claim 12, wherein the vehicle is traveling on a roadway, the light pattern display is attached to one or more road barriers located over a distance along the roadway, and the light pattern is distributed across the one or more road barriers.

18. The method of claim 12, wherein the road state data comprises one or more of a driving suggestion, a road hazard, a road incident, and waypoint information.

19. The method of claim 12, wherein the capability of the vehicle comprises the vehicle having a particular type of sensor, and determining the type for the light pattern comprises:

determining, from the plurality of candidate types of light patterns, the type for the light pattern that can be processed by the particular type of sensor on the vehicle.

20. One or more non-transitory storage media encoded with instructions that when executed by a computing device cause the computing device to perform operations for selectively issuing light patterns from one or more visual cue units, the operations comprising:

receiving road state data;

determining, from a plurality of candidate types of light patterns, a type for a light pattern based on a capability of a vehicle that the light pattern is to be targeted to, wherein the capability of the vehicle comprises the vehicle having a particular type of sensor, and determining the type for the light pattern comprises:

determining, from the plurality of candidate types of light patterns, the type for the light pattern that can be processed by the particular type of sensor on the vehicle;

determining the light pattern based on the road state data and the type for the light pattern; and issuing the light pattern on a light pattern display of a visual cue unit.

* * * * *